(12) United States Patent
Yanai et al.

(10) Patent No.: US 7,952,666 B2
(45) Date of Patent: May 31, 2011

(54) OPTICAL COMPENSATION FILM, POLARIZING PLATE, AND LIQUID CRYSTAL DISPLAY DEVICE

(75) Inventors: Yujiro Yanai, Minami-ashigara (JP); Hiroyuki Kaihoko, Minami-ashigara (JP)

(73) Assignee: Fujifilm Corporation, Minato-Ku, Tokyo (JP)

(*) Notice: Subject to any disclaimer, the term of this patent is extended or adjusted under 35 U.S.C. 154(b) by 379 days.

(21) Appl. No.: 12/239,233

(22) Filed: Sep. 26, 2008

(65) Prior Publication Data
US 2009/0091695 A1 Apr. 9, 2009

(30) Foreign Application Priority Data
Sep. 27, 2007 (JP) .................. 2007-251749
May 30, 2008 (JP) .................. 2008-143373

(51) Int. Cl.
*G02F 1/1335* (2006.01)

(52) U.S. Cl. ............ 349/117; 349/96; 349/106
(58) Field of Classification Search ........ 349/117, 349/96, 106
See application file for complete search history.

(56) References Cited

U.S. PATENT DOCUMENTS
6,582,775 B1 * 6/2003 Payne et al. ............ 427/508
2002/0063826 A1 * 5/2002 Okamoto et al. ........ 349/117

FOREIGN PATENT DOCUMENTS
JP 2002-221622 A 8/2002

* cited by examiner

*Primary Examiner* — Mike Qi
(74) *Attorney, Agent, or Firm* — Buchanan Ingersoll & Rooney PC

(57) ABSTRACT

Disclosed is an optical compensation film comprising an optically-anisotropic layer and at least one optically-isotropic layer adjacent to the optically-anisotropic layer and having a refractive index that differs from the mean refractive index of the optically-anisotropic layer.

10 Claims, 4 Drawing Sheets

OPTICAL COMPENSATION FILM, POLARIZING PLATE, AND LIQUID CRYSTAL DISPLAY DEVICE

CROSS-REFERENCE TO RELATED APPLICATIONS

This application claims benefit of priority under 35 U.S.C. 119 to Japanese Patent Application Nos. 2007-251749 filed on Sep. 27, 2007 and 2008-143373 filed on May 30, 2008; and the entire contents of the application are incorporated herein by reference.

BACKGROUND OF THE INVENTION

1. Field of the Invention

The present invention relates to an optical compensation film and a polarizing plate useful as constitutive members of liquid-crystal display devices, and to a liquid-crystal display device.

2. Related Art

Various optical compensation films have been proposed for improving the viewing angle properties of liquid-crystal display devices. The optical compensation films compensate birefringence of a liquid-crystal cell, thereby contributing toward improving viewing angle properties. However, the viewing angle properties of a liquid-crystal display device are greatly influenced by the shifting of the transmission axes of a pair of polarizers disposed inside the liquid-crystal display device, from vertical configuration when being observed in oblique directions, or that is, by the viewing angle properties of the polarizers. The viewing angle properties of polarizers cause the color shift to occur when liquid-crystal display devices employing any mode in the black state are observed in oblique directions.

JPA No. 2002-221622 proposes a wide-viewing angle polarizing film produced by laminating retardation films satisfying predetermined optical characteristics, as a polarizing film capable of preventing light leakage in oblique directions of the polarizing film and free from a problem of coloration of the leaking light.

SUMMARY OF THE INVENTION

One object of the invention is to provide an optical compensation film that contributes toward reducing the color shift to occur when a liquid crystal display device in the black state is observed in oblique directions.

Another object of the invention is to provide a polarizing plate capable of reducing light leakage and color shift to occur owing to transmission axis shifting from vertical configuration.

Another object of the invention is to provide a liquid-crystal display device that reduces the color shift to occur in oblique directions in the black state.

The means for achieving the above mentioned objects are as follows.

[1] An optical compensation film comprising:
an optically-anisotropic layer and
at least one optically-isotropic layer adjacent to the optically-anisotropic layer and having a refractive index that differs from the mean refractive index of the optically-anisotropic layer.

[2] The optical compensation film as set forth in [1], wherein the refractive index of the optically-isotropic layer is smaller than the mean refractive index of the optically-anisotropic layer.

[3] The optical compensation film as set forth in [1], wherein the refractive index of the optically-isotropic layer is larger than the mean refractive index of the optically-anisotropic layer.

[4] The optical compensation film as set forth in any one of [1] to [3], wherein the difference between the refractive index of the optically-isotropic layer and the mean refractive index of the optically-anisotropic layer is at least 0.05.

[5] The optical compensation film as set forth in any one of [1] to [4], wherein the refractive index of the optically-isotropic layer has wavelength dispersion characteristics.

[6] The optical compensation film as set forth in any one of [1] to [5], wherein the refractive index of the optically-isotropic layer and the mean refractive index of the optically-anisotropic layer satisfy $|n1(450)-n2(450)| \geq 0.05$ in which $n1(\lambda)$ and $n2(\lambda)$ each mean the refractive index of the optically-isotropic layer and the mean refractive index of the optically-anisotropic layer, respectively, at a wavelength $\lambda$ [nm].

[7] The optical compensation film as set forth in any one of [1] to [6], wherein said at least one optically-isotropic layer is disposed on either of the surface or the rear surface thereof.

[8] The optical compensation film as set forth in any one of [1] to [7], wherein said at least one optically-isotropic layer is disposed on both the surface and the rear surface thereof.

[9] A polarizing plate comprising a polarizing element and an optically-isotropic layer adjacent to the polarizing element and having a refractive index that differs from the mean refractive index of the polarizing element.

[10] A polarizing plate comprising a polarizing element and an optical compensation film as set forth in any one of [1] to [8].

[11] A liquid-crystal display device comprising an optical compensation film as set forth in any one of [1] to [8].

[12] A liquid-crystal display device comprising at least one laminate structure of an optically-isotropic layer having a refractive index $n1$ and an optically-anisotropic layer having a mean refractive index $n2$ ($n1 \neq n2$) adjacent thereto.

[13] The liquid-crystal display device as set forth in [12], further comprising an optically-anisotropic layer or an optically-isotropic layer having a mean refractive index $n3$ ($n1 \neq n3$).

[14] The liquid-crystal display device as set forth in [12] or [13], wherein said at least one laminate structure is disposed between the liquid-crystal cell and a polarizing element therein.

[15] The liquid-crystal display device as set forth in any one of [12] or [13], wherein said at least one laminate structure is disposed in the liquid—crystal cell therein and the optically-anisotropic layer is a color filter layer.

[16] The liquid-crystal display device as set forth in [12] or [13], which comprises a color filter comprising at least first and second color layers each having a different color and in which the optically-isotropic layer is disposed in the region corresponding to the first color layer and the optically-isotropic layer is not disposed in the region corresponding to the second color layer.

[17] The liquid-crystal display device as set forth in any one of [12] to [16], which comprises an RGB color filter and in which the optically-isotropic layer is disposed in the region corresponding to the B layer of the RGB color filter, satisfying the following relational formulas:

$$|n1\_b - n\_g| \geq 0.05, \text{ and}$$

$$|n1\_b - n\_r| \geq 0.05,$$

wherein n1_b is the refractive index at a wavelength of 450 nm of the optically-isotropic layer disposed in the region corresponding to the B layer; n_g and n_r each are the mean refractive index of the G layer and the R layer, respectively; and the refractive index of the color layer means the refractive index thereof at a wavelength at which the transmittance thereof is the largest.

Figure 1:
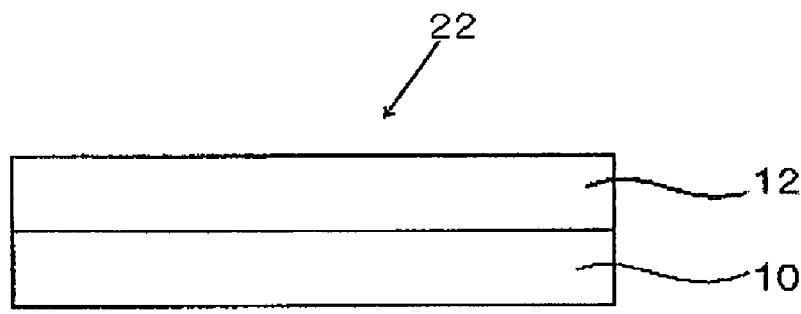
FIG. 1 shows a schematic cross-sectional view of an example of an optical compensation film of the invention.

In the drawings, the reference numerals have the following meanings:
10 Optically-anisotropic layer
12, 12a, 12b, 12" Optically-isotropic layer
20 Polarizing element
22, 22', 22" Optical compensation film of the invention (In FIGS. 5, 6 and 7, this serves also as a protective film for the polarizing element.)
24 Cell substrate
26 Liquid-crystal layer
27 Color filter
LC Liquid-crystal cell
PL1, PL1', PL1", PL2, PL2' Polarizing Plate

PREFERRED EMBODIMENT OF THE INVENTION

The invention is described in detail hereinunder. In this description, the numerical range expressed by the wording "a number to another number" means the range that falls between the former number indicating the lowermost limit of the range and the latter number indicating the uppermost limit thereof.

[Optical Compensation Film]

The optical compensation film of the invention comprises an optically-anisotropic layer and an optically-isotropic layer adjacent to the optically-anisotropic layer and having a refractive index that differs from the mean refractive index of the optically-anisotropic layer. Light having entered an optically-anisotropic layer undergoes retardation; however, since the degree of retardation differs depending on the wavelength of the incident light, the light polarization state fluctuates. According to the invention, based on the difference in the refractive index between the optically-anisotropic layer and the optically-isotropic layer, the polarization state of the incident light that comes in the optical compensation film is controlled and, as a result, the color shift of the polarized light that goes out of the film in oblique directions can be thereby reduced. The optical compensation film of the invention is especially excellent in reducing the color shift in red that is readily visible to human eyes. The optical compensation film of the invention can reduce the color shift to occur when a liquid crystal display device employing any mode in the black state is observed in oblique directions. The effect of the invention can be attained by disposing an optically-isotropic layer that satisfies the above-mentioned condition, on the surface of various already-existing optical compensation films.

Preferably, the difference in the refractive index between the optically-anisotropic layer and the optically-isotropic layer is equal to or more than 0.05, more preferably equal to or more than 0.1. The larger the difference in the refractive index is, the greater the effect of the invention is; and therefore, in terms of the effect of the invention, the difference in the refractive index has no uppermost limit. However, in consideration of the realizability of the invention by the use of already-existing materials, the difference in the refractive index difference may be equal to or less than 0.5. In the description, the term "refractive index" of an optically-anisotropic layer means a mean refractive index thereof.

The refractive index of the optically-isotropic layer may be higher or lower than the refractive index of the optically-anisotropic layer, but for obtaining the above-mentioned effect with no influence on the display performance of devices employing the film, the refractive index of the optically-isotropic layer is preferably lower than the refractive index of the optically-anisotropic layer. Embodiments realizable by the use of already-existing material are taken into consideration. In one preferred embodiment, the optically-isotropic layer has a low refractive index of from 1.0 to 1.4 or so, and the optically-anisotropic layer has a high refractive index of from 1.45 to 1.6 or so. In a more preferred embodiment, the refractive index of the optically-isotropic layer is from 1.2 to 1.3 or so, and the refractive index of the optically-anisotropic layer is from 1.48 to 1.55 or so.

The refractive index of the optically-isotropic layer may have wavelength dispersion characteristics. When the refractive index of the optically-isotropic layer has wavelength dispersion characteristics, then the polarization state of light going through the layer may be controlled for individual wavelengths of light, and therefore the color shift may be reduced.

Compensation achieved by a conventional retardation film is essentially for controlling the incident light polarization state mainly at a wavelength of green light in terms of brightness reduction; and therefore the color shift through the film is often in blue, red or their mixed color, magenta. From this and from the optical principle of polarization control by the optically-isotropic layer added to the optical compensation film, the color shift could be reduced by the difference in the index given only to the light having a wavelength corresponding to blue. Specifically, in an embodiment where the refractive index of the optically-isotropic layer has wavelength dispersion characteristics in a visible light region, and/or where the refractive index of the optically-anisotropic layer has wavelength dispersion characteristics in a visible light region, the difference between the refractive index n1 of the optically-isotropic layer and the refractive index n2 of the optically-anisotropic layer, |n1−n2| may also have wavelength dispersion characteristics, as fluctuating depending on the wavelength of light given thereto. For attaining the effect of the invention, preferably, at least the difference between the refractive index n1 (450) of the optically-isotropic layer at a wavelength of 450 nm and the refractive index n2(450) of the optically-anisotropic layer, $|n1(450)-n2(450)|$ is equal to or more than 0.05, more preferably equal to or more than 0.1.

The optical compensation film of the invention preferably has the optically-anisotropic layer as the outermost layer thereof. In an embodiment where the film is stuck to any other member (this may be either optically anisotropic or optically isotropic), preferably, an interface having a difference in the refractive index capable of controlling the polarization state of incident light thereinto is formed between the film and the other member. The optical compensation film of the invention may have two or more of the above-mentioned optically-isotropic layers, and for example, the optically-isotropic layer may be disposed on both of the surface and the rear surface of the optically-anisotropic layer. Also the film may have two or more of the above-mentioned optically-anisotropic layers; and in such a case, the optically-isotropic layer may be disposed between the optically-anisotropic layers.

Figure 2:
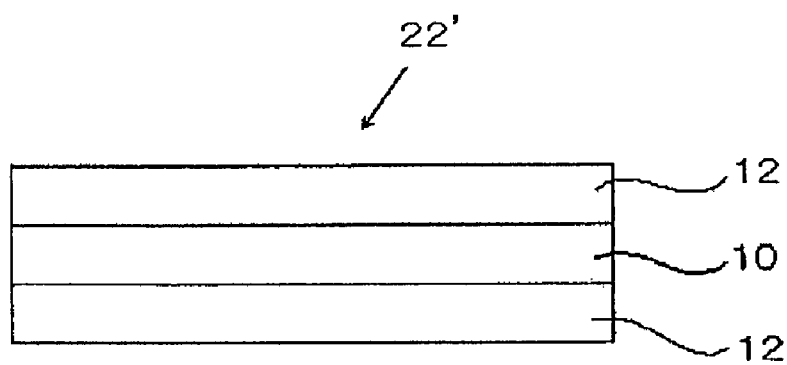
FIG. 2 shows a schematic cross-sectional view of an example of an optical compensation film of the invention.

FIGS. 1 and 2 show schematic cross-sectional views of examples of the optical compensation film of the invention. In these, however, the relative relation in the thickness between the constitutive layers does not always reflect the real relative relation therebetween. The same shall apply also to the other drawings.

The optical compensation film 22 shown in FIG. 1 comprises an optically-anisotropic layer 10 of a birefringent polymer film or the like, and, as formed on the surface thereof, an optically-isotropic layer 12. The optical compensation film 22' shown in FIG. 2 has an optically-isotropic layer 12 on both of the surface and the rear surface of the optically-anisotropic layer 10. The optical compensation films 22 and 22' shown in FIGS. 1 and 2 can control the polarization state of the incident light thereto, based on the difference in the refractive index at the interface between the optically-anisotropic layer 10 and the optically-isotropic layer 12. In the embodiments where the optical compensation film of the type is incorporated into a liquid-crystal display device, it may be stuck to the surface of a member of the device that has a refractive index different from the refractive index of the optically-isotropic layer whereby an interface may be further formed there between that has a difference in the refractive index capable of controlling the polarization state of the incident light into the film.

Various materials usable in producing the optical compensation film of the invention and a method for producing it are described below.

(Optically-Isotropic Layer)

In the invention, the optically-isotropic layer is not specifically defined in terms of its material and its production method. Any desired material may be selected for it depending on the desired refractive index of the layer.

Optically-isotropic Layer Having a Low Refractive Index Which is Equal to or Less than About 1.4:

It is desirable that an optically-isotropic layer is formed as a layer having a relatively low refractive index, thereby to produce a difference between its refractive index and the mean refractive index of the optically-anisotropic layer to be combined with it. Various materials having a low refractive index may be used for forming the layer having a low refractive index. In order to make the layer optically isotropic and in order not to impart to the layer opacity or coloration that may have some influence on the display performance of devices, the layer is preferably formed of any of the following materials that are used in forming a layer having a low refractive index of an antireflection film.

As one example of the optically-isotropic layer having a low refractive index, there may be mentioned a thin film of a metal oxide. The thin layer of a metal oxide may be formed, for example, through chemical vapor deposition (CVD) or physical vapor deposition (PVD), and more concretely, it may be formed according to a vacuum evaporation method or a sputtering method that are examples of physical vapor deposition.

As another example of the optically-isotropic layer having a low refractive index, there may be mentioned a thin film having a low-refractive index containing microvoids. Having microvoids formed therein, the layer may have a refractive index near to the refractive index of air, 1.00. The microvoids are formed between the fine particles in the layer and/or inside the fine particles. The microvoids-containing layer may be formed by applying a dispersion of organic fine particles, inorganic fine particles or their composite fine particles to a surface and drying it. The materials and the methods for forming the layer having a low refractive index of this embodiment are described in detail, for example, in JPA Nos. hei 9-222502, hei 9-288201 and hei 11-6902; and these may be referred to in forming the optical-isotropic layer having a low refractive index in the invention.

As the optical-isotropic layer having a low refractive index, also usable is a coating layer that contains a fluorine compound as the main ingredient thereof. Examples of the fluorine compound include fluoropolymers, fluorine-containing surfactants, fluorine-containing ethers, and fluorine-containing silane compounds. More concretely, herein mentioned are the fluorine-containing compounds described in JPA No. hei 9-222503, paragraphs [0018] to [0026]; JPA No. hei 11-38202, paragraphs [0019] to [0030]; JPA No. 2001-40284, paragraphs [0027] to [0028]; and JPA NO. 2000-284102, paragraphs [0036] to [0052]. As the fluoropolymers, preferred are copolymers that comprise a fluorine atom-containing repetitive structure unit, a crosslinking or polymerizing functional group-containing repetitive structure unit, and a repetitive structure unit comprising any other substituent. The crosslinking or polymerizing functional group is preferably a radical polymerizing or cationic polymerizing group. The fluoropolymer may be combined with a silicone compound to form the optically-isotropic layer having the low refractive index. The silicone compound is a polysiloxane structure-having compound, preferably having a curable functional group or a polymerizing functional group in the polymer chain and capable of forming a crosslinked structure in the cured layer. For example, there are mentioned commercial products of reactive silicones such as Silaplane (by Chisso); and compounds having a polysiloxane structure terminated with a silanol group such as those descried in JPA No. hei 11-258403. The optically-isotropic layer having a low refractive index of this embodiment may be formed by preparing a coating liquid of the above-mentioned material, applying it to a surface of an optically-anisotropic layer and drying it. When the fluoropolymer having a crosslinking or polymerizing group is used, preferably, it is crosslinked or polymerized during or after coating with the coating liquid by irradiating the coating layer with light or by heating it. If desired, the coating liquid may contain a polymerization initiator, a sensitizer, etc. The method for producing the optically-isotropic layer having a low refractive index and the agents to be used for it are described in the above-mentioned references; and in forming the optically-isotropic layer having a low refractive index in the invention, the references may be referred to.

As other examples of the optically-isotropic layer having a low refractive index, also preferred is a sol-gel cured film formed by curing through condensation of a composition comprising a silane coupling agent such as a specific fluoro-hydrocarbon group-containing silane coupling agent in the presence of a catalyst. For example, there are mentioned a polyfluoroalkyl group-containing silane compound or its partially-hydrolyzed condensate (e.g., compounds described in JPA No. syo 58-142958, 58-147483 and 58-147484), a perfluoroalkyl group-containing silane coupling agent as in JPA No. hei 9-157582, a silyl compound having a fluorine-containing long-chain group, "perfluoroalkyl ether" group (e.g., compounds described in JPA Nos. 2000-117902, 2001-48590 and 2002-53804). Also preferred is a film formed by curing a composition that contains a hydrolyzed partial condensate of an organosilane, as in JPA No. 2001-40284. These materials may form a network structure by curing, and the layer formed of it may have a low refractive index. The low-refractivity layer of this embodiment may be formed by preparing a sol that contains the above-mentioned ingredient, then applying the sol onto a surface and heating and drying it. For promoting the curing reaction, the coating layer may be irradiated with energy rays.

Optically-isotropic Layer Having a High Refractive Index Which is Equal to or More than About 1.7:

An optically-isotropic layer having a relatively high refractive index may be formed, thereby producing a difference between the refractive index of the layer and the mean refractive index of the optically-anisotropic layer to be combined with it. For example, this is effective when the optically-anisotropic layer has a relative low refractive index. The layer having a high refractive index may be formed of a material having a high refractive index; however, in order to make the layer optically isotropic and in order not to impart to the layer opacity or coloration that may have some influence on the display performance of devices, the layer is preferably formed of any of the following materials that are used in forming a layer having a high refractive index of an antireflection film.

One example of the optically-isotropic layer having a high refractive index is a cured layer comprising at least high-refractivity inorganic compound particles and a matrix binder. The materials and the methods usable in forming the cured layer described in detail, for example, in JPA Nos. hei 11-295503, hei 11-153703, 2000-9908, 2001-272502, 2001-166104 and hei 11-153703, U.S. Pat. No. 6,210,858, JPA Nos. 2001-315242, 2001-31871 and 2001-296401; and in forming the optically-isotropic layer having a high refractive index in the invention, these may be referred to.

As other examples of the optically-isotropic layer having a high refractive index, there is mentioned a cured layer to be produced from a composition comprising a colloidal metal oxide obtained from a hydrolyzed condensate of a metal alkoxide, or a composition comprising a metal alkoxide. The materials and the methods usable in forming the cured layer are described in detail, for example, in JPA No. 2001-293818; and in forming the optically-isotropic layer having a high refractive index in the invention, this may be referred to.

In the optical compensation film of the invention, the optically-isotropic layer may be an adhesive layer. Such an adhesive optically-isotropic layer is advantageous, for example, in sticking it to any other member.

The thickness of the optically-isotropic layer is not specifically defined. In order to satisfy the requirement for thin-wall devices, the thickness of the layer is preferably smaller. For example, in the embodiments where the optically-isotropic layer is formed according to a coating method, its thickness may be from 1.0 to 2.0 µm or so. However, the thickness should not be limited to this range.

Preferably, the optically-isotropic layer is not processed for stretching or the like to induce optical anisotropy; and therefore, the optically-isotropic layer is preferably formed by directly applying a predetermined material to the surface of the underlying optically-anisotropic layer according to a coating method, as in the above-mentioned embodiments. The coating operation may be attained in various methods of, for example, a dipping method, an air knife coating method, a curtain coating method, a roller coating method, a wire bar coating method, a gravure coating method, a microgravure coating method or an extrusion coating method (U.S. Pat. No. 2,681,294). Needless-to-say, an optically-isotropic film may be separately formed and it may be stuck to the surface of an optically-anisotropic layer to be coated with it, so far as the film can be an optically-isotropic layer satisfying the above-mentioned condition.

In the invention, the refractive index of the optically-isotropic layer may have wavelength dispersion characteristics. Specifically, the refractive index of the layer may differ depending on the wavelength of the incident light thereinto. In general, the refractive index of an ordinary substance shows a wavelength dispersion curve indicating a higher refractive index at a shorter wavelength of light (regular wavelength dispersion characteristics of the refractive index). A mixture prepared by mixing materials each having a different refractive index may have reversed wavelength dispersion characteristics of the refractive index of such that its refractive index is lower at a shorter wavelength of light. The wavelength dispersion characteristics of the refractive index of the mixture can be calculated according to the formula described in Maxwell, G., J. C., Colours in Metal Glasses and Metal Films, Philos. Trans. R. Soc. London, Sect. A, Vol. 3, 385-420 (1904); and according to the formula described in D. A. G. Bruggeman, Ann. Phys. (Leipzig), Vol. 24, 636-665 (1935).

(Optically-Anisotropic Layer)

The optical compensation film of the invention comprises an optically-anisotropic layer. The optically-anisotropic layer is not specifically limited at all in point of its material, constitution, etc. Various optical compensation films used for optical compensation for any types of liquid-crystal display devices may be used directly as they are for the optically-anisotropic layer in the invention. Concretely, as the optically-anisotropic layer, usable are any of a birefringent polymer film, a multilayered birefringent polymer film, a cured film of a liquid-crystal composition, a multilayered cured film of a liquid-crystal composition, a laminate of such a cured film of liquid crystal and a polymer film, etc.

For example, on the surface of an optical compensation film that is used in any types of liquid-crystal display devices, an optically-isotropic layer having a low refractive index may be formed according to the above-mentioned method, and the thus-modified optical compensation film can reduce the color shift to occur in oblique directions, not detracting at all from the optical compensatory capability of the film.

Examples of the birefringent film includes films of cellulose ester (e.g., triacetyl cellulose, diacetyl cellulose, propionyl cellulose, butyryl cellulose, acetylpropionyl cellulose, nitrocellulose), polyamide, polycarbonate, polyester (e.g., polyethylene terephthalate, polyethylene naphthalate, poly-1,4-cyclohexanedimethylene terephthalate, polyethylene 1,2-diphenoxyethane-4,4'-dicarboxylate, polybutylene terephthalate), polystyrene (e.g., syndiotactic polystyrene), polyolefin (e.g., polypropylene, polyethylene, polymethylpentene), polysulfone, polyether sulfone, polyarylate, polyether imide, polymethyl methacrylate, polyether ketone, etc.

The liquid crystal to be sued in forming the cured liquid-crystal film is not also specifically defined. Any of rod-like liquid crystals and discotic liquid crystals are usable.

[Polarizing Plate]

Figure 3:
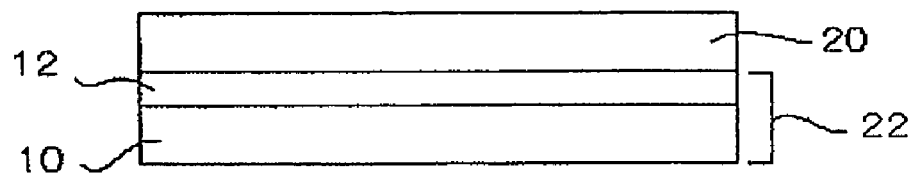
FIG. 3 shows a schematic cross-sectional view of an example of a polarizing plate of the invention.
Figure 4:
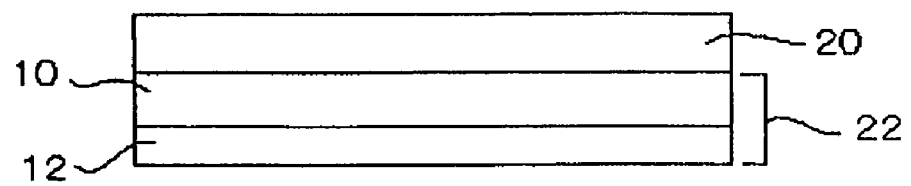
FIG. 4 shows a schematic cross-sectional view of an example of a polarizing plate of the invention.

The invention also relates to a polarizing plate comprising a polarizing film and the optical compensation film of the invention. Examples of the polarizing plate of the invention are shown in FIGS. 3 and 4. The polarizing plates shown in FIGS. 3 and 4 comprise a polarizing element 20 and, as formed on one surface thereof, a protective film 22. Preferably, it has a protective film additionally on the other surface thereof. The protective film 22 is one embodiment of the optical compensation film of the invention shown in FIG. 1, and comprises an optically-anisotropic layer 10 and an optically-isotropic layer 12. In FIG. 3, the constitutive layers are so disposed that the surface of the optically-isotropic layer 12 is kept in contact with the surface of the polarizing element 20; and in FIG. 4, the surface of the optically-anisotropic layer 10 is kept in contact with the surface of the polarizing element 20. In the polarizing plates shown in FIGS. 3 and 4, the polarization state of the incident light running thereinto is controlled by the difference in the refractive index at the interface between the optically-isotropic layer 10 and the optically-anisotropic layer 12. In addition, in the polarizing plate shown in FIG. 3, when the refractive index of the polarizing element 20 differs from that of the optically-isotropic layer 12, then the polarization state of the incident light is controlled also by the difference in the refractive index at the interface between the two.

The invention also relates to a polarizing plate comprising a polarizing element and an optically-isotropic layer formed adjacent to the polarizing element and having a refractive index different from the mean refractive index of the polarizing element. The polarizing element may have a refractive index in some degree, and when an interface is formed between the surface of the polarizing element and the optically-isotropic layer having a different refractive index, then the polarization state of the incident light running into the polarizing plate may be controlled thereby reducing the color shift of the polarized light going out of the polarizing plate in oblique directions. A protective film and a retardation film may be further disposed on the optically-isotropic layer formed on the surface of the polarizing element. Further, a protective film and the like may also be formed on the other surface not having an optically-isotropic layer thereon. When the polarizing plate of this embodiment is incorporated into a liquid-crystal display device, it is desirable that the optically-isotropic layer is disposed between the liquid-crystal cell and the polarizing element in the device, in terms of attaining a better effect.

(Polarizing Element)

For the polarizing element that the polarizing plate of the invention is to have, usable are any of iodine-based polarizing films, dichroic dye-containing polarizing films and polyene-based polarizing films. In general, iodine-based polarizing films and dye-based polarizing films are produced by the use of polyvinyl alcohol films.

(Second Protective Film)

The polarizing plate of the invention preferably has a second protective film in addition to the optical compensation film of the invention. The second protective film is stuck to the other surface of the polarizing element to which the optical compensation film of the invention is not stuck. The material of the second protective film is not specifically limited, and may be any of cellulose acylate films, polycarbonate films and norbornene-based films.

[Liquid-Crystal Display Device]

The invention also relates to a liquid-crystal display device comprising at least one laminate structure of an optically-isotropic layer having a refractive index n1 and an optically-anisotropic layer having a mean refractive index n2 (n1≠n2) adjacent thereto. As the laminate structure, usable is the optical compensation film or the polarizing plate of the invention; and the structure may be thus incorporated into the inside of a liquid-crystal display device.

Figure 5:
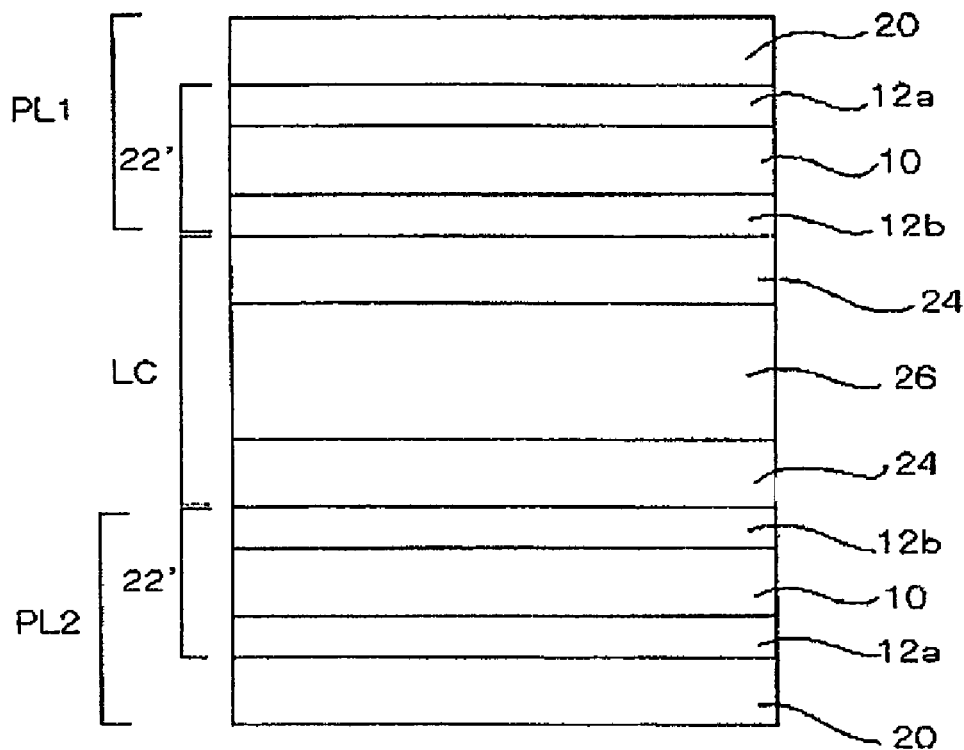
FIG. 5 shows a schematic cross-sectional view of one example of a liquid-crystal display device of the invention.

FIG. 5 shows a schematic cross-sectional view of one example of the liquid-crystal display device of the invention.

The liquid-crystal display device shown in FIG. 5 comprises a liquid-crystal cell LC, and a pair of polarizing plates PL1 and PL2 disposed to sandwich the cell therebetween. The polarizing plates PL1 and PL2 are polarizing plates of the invention, each having the optical compensation film 22' of the invention shown in FIG. 2 as the protective film disposed on the side of the liquid-crystal cell of the polarizing element 20. In general, a protective film may be disposed also on the outer surface of the polarizing element 20, but this is omitted in FIG. 5. The optical compensation film 22' serving as a protective film comprises an optically-anisotropic layer 10 and optically-isotropic layers 12a and 12b formed on both of the surface and the rear surface of the layer 10, in which the surface of the optically-isotropic layer 12a is stuck to the surface of the polarizing element 20. The other optically-isotropic layer 12b is stuck to the surface of the substrate 24 of the liquid-crystal cell LC. In the liquid-crystal display device shown in FIG. 5, the polarization state of the incident light running thereinto is controlled by the difference in the refractive index at the interface between the optically-anisotropic layer 10 and any of the optically-isotropic layers 12a and 12b, and in addition, in the embodiments where the refractive index of the polarizing element 20 differs from that of the optically-isotropic layer 12 and/or in the embodiments where the refractive index of the substrate 24 differs from that of the optically-isotropic layer 12, the polarization state of the incident light may also be controlled by the difference in the refractive index at the interface between them. As a result, the color shift, especially red color shift, which may occur when the device in the black state is observed in oblique directions, may be reduced.

Figure 6:
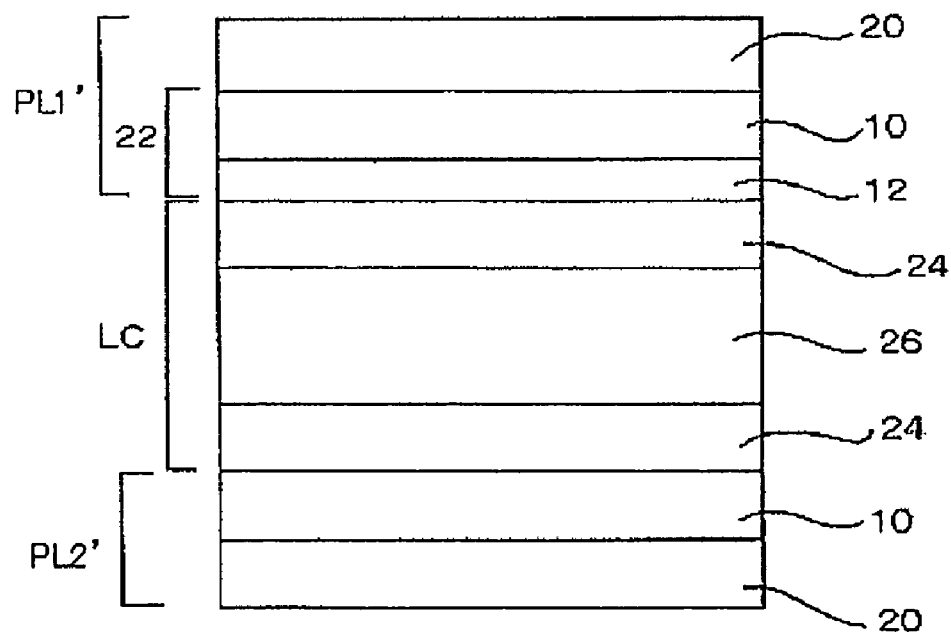
FIG. 6 shows a schematic cross-sectional view of another example of a liquid-crystal display device of the invention.

FIG. 6 shows a schematic cross-sectional view of another example of the liquid-crystal display device of the invention.

The liquid-crystal display device shown in FIG. 6 comprises a liquid-crystal cell LC and a pair of polarizing plates PL1' and PL2' disposed to sandwich the cell therebetween. The polarizing plate PL1' is a polarizing plate of the invention, having an optical compensation film 22 of the invention shown in FIG. 1, as the protective film disposed on the side of the liquid-crystal cell of the polarizing element 20. In general, a protective film may be disposed also on the outer surface of the polarizing element 20, but this is omitted in FIG. 6. The optical compensation film 22 serving as a protective film comprises an optically-anisotropic layer 10 and an optically-isotropic layer 12 formed on the surface thereof, in which the surface of the optically-isotropic layer 12 is stuck to the surface of the substrate 24 of the liquid-crystal cell. In the liquid-crystal display device shown in FIG. 6, the polarization state of the incident light running thereinto is controlled by the difference in the refractive index at the interface between the optically-anisotropic layer 10 and the optically-isotropic layer 12, and in addition, in the embodiments where the refractive index of the substrate 24 differs from that of the optically-isotropic layer 12, the polarization state of the incident light may also be controlled by the difference in the refractive index at the interface between them. As a result, the color shift, which may occur when the device in the black state is observed in oblique directions, may be reduced.

The polarizing plate PL2' is a polarizing plate having an optically-anisotropic layer 10 as the protective film disposed on the side of the liquid-crystal cell of the polarizing element 20, and this does not have an optically-isotropic layer. The example shown in FIG. 6 is an embodiment having a laminate structure of an optically-isotropic layer having a refractive index n1 and an optically-anisotropic layer having a mean refractive index n2 (n1≠n2) adjacent thereto, only between the liquid-crystal cell and one polarizing element. As well as the embodiment shown in FIG. 5, this embodiment may also attain the effect of the invention.

Heretofore, it is said that an optically-anisotropic layer for use for optical compensation preferably has wavelength dispersion characteristics of retardation that are ideal for optical compensation. In order to attain the same effect as that of the optically-anisotropic layer having ideal wavelength dispersion characteristics of retardation, it is also desirable to dispose an optically-isotropic layer above a specific color layer of a color filter. For example, in the embodiments employing an RGB color filter, it is desirable to dispose an optically-isotropic layer in the region corresponding to the blue layer therein, and by disposing the optically-isotropic layer at the above mentioned position, the color shift to occur in oblique direction may be reduced. This effect may be attained by disposing an optically-isotropic layer in contact with a color filter; and it may also be attained even though the optically-isotropic layer is not in contact with a color filter. In other words, the optically-isotropic layer may be disposed inside a liquid-crystal cell or outside it; and in the embodiment where the layer is disposed inside the cell, the layer may be disposed on the inner surface of the same substrate on which a color filter is formed, or may be disposed on the inner surface of the other substrate.

Figure 7:
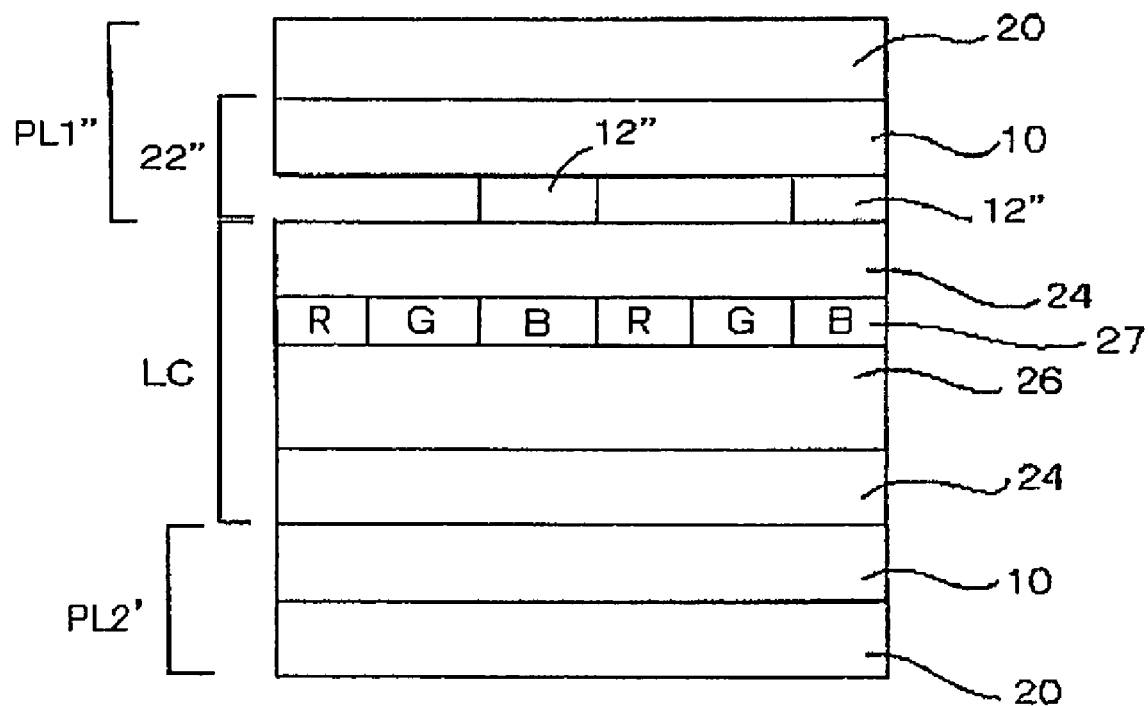
FIG. 7 shows a schematic cross-sectional view of another example of a liquid-crystal display device of the invention.

FIG. 7 shows a schematic cross-sectional view of one example of the liquid-crystal display device of the invention comprising an RGB color filter.

The liquid-crystal display device shown in FIG. 7 comprises a liquid-crystal cell LC, and a pair of polarizing plates PL1" and PL2' disposed to sandwich the cell therebetween. On the inner surface of the substrate 24 at the display side of the liquid-crystal cell LC, disposed is an RGB color filter 27 having a red (R) layer, a green (G) layer and a blue (B) layer, thereby enabling color image display. The polarizing plate PL1" is a polarizing plate of the invention, having an optical compensation film 22" of the invention as the protective film disposed at the side of the liquid-crystal cell of the polarizing element 20. In general, a protective film may be disposed also on the outer surface of the polarizing element 20, but this is omitted in FIG. 7. The optical compensation film 22" serving as a protective film comprises an optically-anisotropic layer 10 and an optically-isotropic layer 12" formed on the surface thereof, in which the surface of the optically-isotropic layer 12" is stuck to the surface of the substrate 24 of the liquid-crystal cell. In the liquid-crystal display device shown in FIG. 7, the polarization state of the incident light running thereinto is controlled by the difference in the refractive index at the interface between the optically-anisotropic layer 10 and the optically-isotropic layer 12", and in addition, in the embodiments where the refractive index of the substrate 24 differs from that of the optically-isotropic layer 12", the polarization state of the incident light may also be controlled by the difference in the refractive index at the interface between them. As a result, the color shift, which may occur when the device in the black state is observed in oblique directions, may be reduced. The polarizing plate PL2' is a polarizing plate having an optically-anisotropic layer 10 as the protective film disposed on the side of the liquid-crystal cell of the polarizing element 20, and this does not have an optically-isotropic layer. The example shown in FIG. 7 is an embodiment having a laminate structure of an optically-isotropic layer having a refractive index n1 and an optically-anisotropic layer having a mean refractive index n2 (n1≠n2) adjacent thereto, only between the liquid-crystal cell and one polarizing element. As well as the embodiment shown in FIG. 5, this embodiment may also attain the effect of the invention.

In the optical compensation film 22" used in the liquid-crystal display device of FIG. 7, the optically-isotropic layer 12" is not disposed to be in contact with the entire surface of the optically-anisotropic layer 10 but is disposed only in the region corresponding to the blue layer B of the color filter 27. In the embodiment of FIG. 7, the polarization state of the incident light running thereinto is controlled by the difference in the refractive index at the interface between the optically-anisotropic layer 10 and the optically-isotropic layer 12", like in the embodiment of FIG. 6; and as a result, the color shift, which may occur when the device in the black state is observed in oblique directions, may be reduced. In the embodiment of FIG. 7, the optically-isotropic layer is disposed only in the region corresponding to the blue layer; but as so described in the above, the effect of the invention can be attained by the difference in the refractive index made only to the light having a wavelength corresponding to blue light, and therefore, as well as the embodiment shown in FIG. 6. in which the optically-isotropic layer is formed uniformly, the embodiment shown in FIG. 7 can also attain the effect of reducing the color shift in oblique directions.

In the invention, the laminate structure of an optically-isotropic layer having a refractive index n1 and an optically-anisotropic layer having a mean refractive index n2 (n1≠n2) adjacent thereto may be disposed inside a liquid-crystal cell. In one example of this embodiment, a color filter layer may function as the optically-anisotropic layer. The color filter layer may serve as an optically-anisotropic layer depending on the material constituting it, and therefore, when an optically-isotropic layer is formed adjacent to the color filter layer, the laminate structure is incorporated into the inside of a liquid-crystal cell. The optically-isotropic layer may be disposed on the entire surface of the color filter layer, or like the optically-isotropic layer 12" shown in FIG. 7, it may be disposed only partly on the layer. In an embodiment of using an RGB color filter layer, the optically-isotropic layer may be disposed at least on the B layer, and even though the optically-isotropic layer is not disposed on the R layer and the G layer, the structure can attain the effect of the invention.

In the embodiment of the invention where the laminate structure of an optically-isotropic layer having a refractive index n1 and an optically-anisotropic layer having a mean refractive index n2 (n1≠n2) adjacent thereto is incorporated inside a liquid-crystal cell, the member capable of functioning as the optically-anisotropic layer is not limited to the color filter. For example, in an embodiment where the optically-isotropic layer is in contact with the liquid-crystal layer in the liquid-crystal cell, the liquid-crystal layer could function as the optically-anisotropic layer. In other words, it is not always necessary to dispose the optically-isotropic layer to be in contact with the color filter layer; and even an embodiment where the optically-isotropic layer is disposed on the inner surface of the substrate opposite to the substrate on which a color filter is formed in the pair of two substrates of the liquid-crystal cell, can attain the effect of the invention.

In the embodiments of the invention where an optically-isotropic layer is disposed in the region corresponding to the B layer of an RGB color filter (including both an embodiment having an optically-isotropic layer disposed inside a cell, and an embodiment having the layer outside the cell), the refractive index n1_b of the optically-isotropic layer, and the refractive index n_r and n_g of the R layer and the G layer, respectively, preferably satisfy the following relational formulas:

|n1_b−n_g|≧0.05, and

|n1_b−n_r|≧0.05.

In these, n1_b means the refractive index at a wavelength of 450 nm of the optically-isotropic layer disposed in the region corresponding to the blue layer; and n_g and n_r each means the mean refractive index of the green layer and the red layer, respectively, and the refractive index of the color layer is the refractive index thereof at a wavelength at which the transmittance thereof is the largest.

When the above-mentioned relational formulas are satisfied, then it is favorable since the polarization of blue light alone can be controlled, and as a result, the color shift in oblique direction can be thereby reduced.

Another aspect of the invention is a liquid-crystal display device having at least one interface of an optically-isotropic layer having a refractive index of n1, and a layer having a mean refractive index n2 (n1≠n2) adjacent thereto, between a polarizing element and a liquid—crystal cell. The layer having a mean refractive index n2 may be a polarizing element or a substrate of a liquid-crystal cell. It may also be an optically-anisotropic layer disposed between the polarizing element and the liquid-crystal cell.

The effect of the invention, reducing the color shift occurring in oblique directions in the black state, can be obtained in any embodiments employing a TN(Twisted Nematic) mode, VA (vertically aligned) mode, OCB (optically compensated bend) mode, IPS (in-plane switching) mode or ECB (electrically controlled birefringence) mode.

EXAMPLES

The invention is described more concretely with reference to the following Examples, in which the material and the reagent used, their amount and the ratio, the details of the treatment and the treatment process may be suitably modified or changed not overstepping the sprit and the scope of the invention. Accordingly, the invention should not be limited by the Examples mentioned below.

Example 1

Regarding a liquid-crystal display device having a constitution shown in FIG. 5, the effect of the invention was demonstrated. Concretely, u' and v' indicating colors in all directions at a polar angle 60° relative to the displaying plane and an in-plane azimuth angle of from 0° to 360° in the black state were calculated. When u' and v' are more constant irrespective of the azimuth angle, it can be said that the color shift is reduced more. u' indicates the chromaticity to be recognized as red; and v' indicates the chromaticity to be recognized as blue. The refractive index of the optically-isotropic layers 12a and 12b was 1.2. A fluorine compound was used as the material of the layers. The mean refractive index of the optically-anisotropic layer 10 was 1.5. The material of the layer was a triacetyl cellulose film.

As a comparative sample, a liquid-crystal display device was constructed, as modified from the structure of FIG. 5 by removing all the four optically-isotropic layers 12a and 12b, and regarding the comparative sample, its u' and v' in all directions at an in-plane azimuth angle of from 0° to 360° in the black state were calculated. The results are shown as the graph of FIG. 8.

Figure 8:
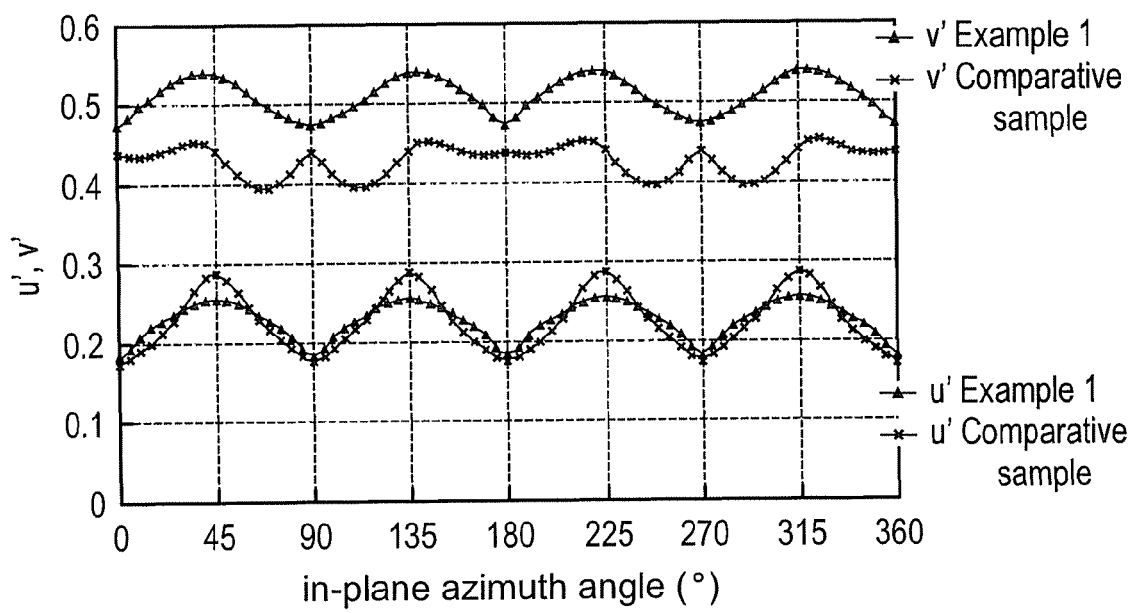
FIG. 8 is a graph showing u' and v' relative to the azimuth angle of an example of the invention and a comparative example.

From the results shown as the graph in FIG. 8, it is understood that, when the curves u' and v' of the sample of the invention are compared with those of the comparative sample, the azimuth angle-dependent amplitude of the curves of the sample of the invention is smaller than that of the comparative sample and Δu' and Δv' of the former are reduced in all directions. In particular, regarding u' that is more readily visible to human eyes, u'max−u'min of the comparative sample is 0.112 but that of the sample of the invention is 0.073, and this means that the red color shift of Example 1 was more reduced compared with the comparative sample. u'max and u'min each mean the maximum u' and the minimum u' in a range of in-plane azimuth angle from 0 to 360 degrees.

Example 2

A liquid-crystal display device of the invention having the same constitution as in Example 1 was constructed, in which, however, the refractive index of the optically-isotropic layers 12a and 12b was 2.0. As the material, used was a cured layer comprising zirconia fine particles and a matrix binder. The mean refractive index of the optically-anisotropic layer 10 was 1.5.

As a comparative sample, a liquid-crystal display device was constructed, as modified from the structure shown in FIG. 5 by removing all the four optically-isotropic layers 12a and 12b, and regarding the comparative sample, its u' and v' in all directions at an in-plane azimuth angle of from 0° to 360° in the black state were calculated. The results are shown as the graph of FIG. 9.

Figure 9:
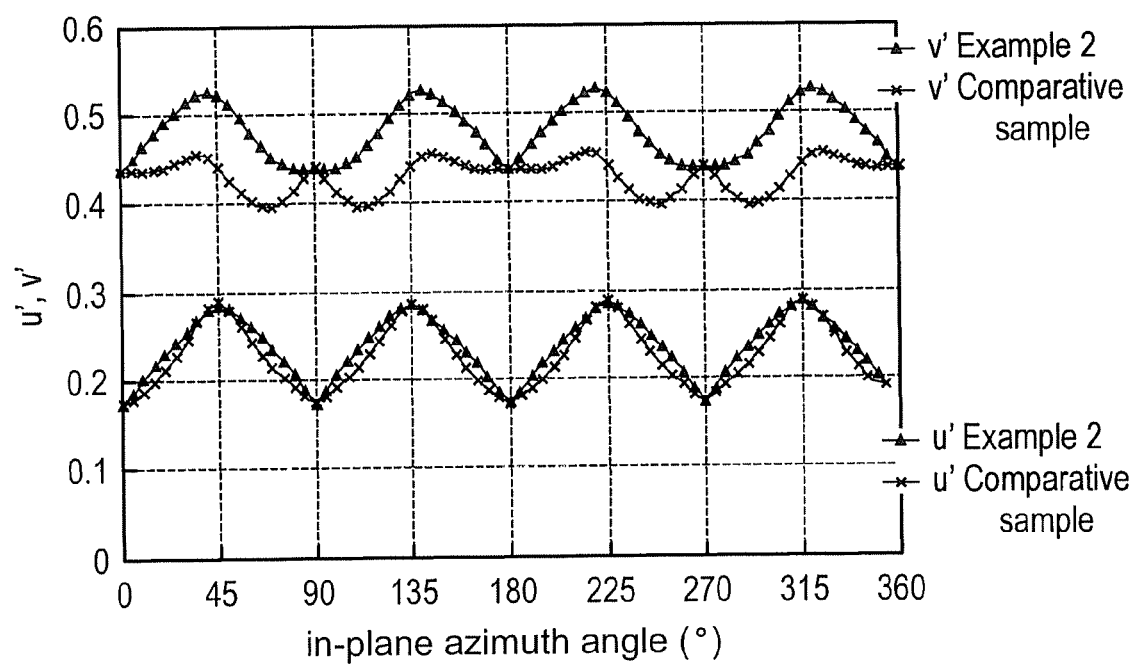
FIG. 9 is a graph showing u' and v' relative to the azimuth angle of an example of the invention and a comparative example.

From the results shown as the graph in FIG. 9, it is understood that, when the curves u' and v' of the sample of the invention are compared with those of the comparative sample, the azimuth angle-dependent amplitude of the curves of the sample of the invention is smaller than that of the comparative sample and Δu' and Δv' of the former are reduced in all directions. In particular, regarding u' that is more readily visible to human eyes, u'max−u'min of the comparative sample is 0.112 but that of the sample of the invention is 0.108, and this means that the red color shift of Example 2 was more reduced compared with the comparative sample.

Example 3

Regarding a liquid-crystal display device having a constitution shown in FIG. 6, the effect of the invention was demonstrated. Concretely, from u' and v' indicating colors in all directions at a polar angle 60° relative to a displaying plane and an in-plane azimuth angle of from 0° to 360° in the black state, $\Delta u'v' = \{(u'max-u'min)^2 + (v'max-v'min)^2\}$ was calculated. In this, u'max (v'max) and u'min (v'min) each mean the maximum and minimum u' (v'), respectively, in a range of from 0° to 360° degrees. When u' and v' are more constant irrespective of the azimuth angle, or that is, when Δu'v' is nearer to 0, then it can be said that the color shift is reduced more.

In this, the refractive index of the optically-isotropic layer 12 was 1.2. The mean refractive index of the optically-anisotropic layer 10 was 1.5.

As a comparative sample, a liquid-crystal display device was constructed, as modified from the structure of FIG. 6 by removing the two optically-isotropic layers 12, and regarding the comparative sample, its Δu'v' was calculated. As a result, Δu'v' of the comparative sample was 0.07 but that of the sample of the invention was 0.059, from which it is understood that the color shift of Example 3 was more reduced compared with the comparative sample.

Example 4

A liquid-crystal display device of the invention having the same constitution as in Example 3 was constructed, in which, however, the refractive index of the optically-isotropic layer 12 was 2.0. The mean refractive index of the optically-anisotropic layer 10 was 1.5. Δu'v' of the sample was calculated.

As a comparative sample, a liquid-crystal display device was constructed, as modified from the structure shown in FIG. 6 by removing the two optically-isotropic layers 12, and regarding the comparative sample, its Δu'v' was calculated. As a result, Δu'v' of the comparative sample was 0.07 but that of the sample of the invention was 0.059, from which it is understood that the color shift of Example 4 was more reduced compared with the comparative sample.

Example 5

Regarding a liquid-crystal display device having a constitution shown in FIG. 7, the effect of the invention was demonstrated. The refractive index of the optically-isotropic layer 12 disposed in contact with the optically-anisotropic layer 10 in the region corresponding to the blue layer of the color filter was 1.2. The mean refractive index of the optically-anisotropic layer 10 was 1.5. The refractive index $n\_r$ and $n\_g$ of the R layer and the G layer, respectively, of the color filter was both 1.5; and the sample satisfied $|n1\_b - n\_g| \geqq 0.05$ and $|n1\_b - n\_r| \geqq 0.05$.

As a comparative sample, a liquid-crystal display device was constructed, as modified from the structure shown in FIG. 7 by removing the optically-isotropic layers 12, and regarding the comparative sample, its Δu'v' was calculated. As a result, Δu'v' of the comparative sample was 0.07 but that of the sample of the invention was 0.056, from which it is understood that the color shift of the sample was more reduced compared with the comparative sample.

Example 6

A liquid-crystal display device of the invention having the same constitution as in Example 5 was constructed, in which, however, the refractive index of the optically-isotropic layer 12 was 2.0. The mean refractive index of the optically-anisotropic layer 10 was 1.5. The refractive index $n\_r$ and $n\_g$ of the R layer and the G layer, respectively, of the color filter was both 1.5; and the sample satisfied $|n1\_b - n\_g| \geqq 0.05$ and $|n1\_b - n\_r| \geqq 0.05$.

As a comparative sample, a liquid-crystal display device was constructed, as modified from the structure shown in FIG. 7 by removing the two optically-isotropic layers 12, and regarding the comparative sample, its Δu'v' was calculated. As a result, Δu'v' of the comparative sample was 0.07 but that of the sample of the invention was 0.056, from which it is understood that the color shift of Example 6 was more reduced compared with the comparative sample.

The invention claimed is:

1. An optical compensation film comprising:
   an optically-anisotropic layer and
   at least one optically-isotropic layer adjacent to the optically-anisotropic layer and having a refractive index that differs from the mean refractive index of the optically-anisotropic layer.

2. The optical compensation film of claim 1, wherein the refractive index of the optically-isotropic layer is smaller than the mean refractive index of the optically-anisotropic layer.

3. The optical compensation film of claim 1, wherein the refractive index of the optically-isotropic layer is larger than the mean refractive index of the optically-anisotropic layer.

4. The optical compensation film of claim 1, wherein the difference between the refractive index of the optically-isotropic layer and the mean refractive index of the optically-anisotropic layer is at least 0.05.

5. The optical compensation film of claim 1, wherein the refractive index of the optically-isotropic layer has wavelength dispersion characteristics.

6. The optical compensation film of claim 1, wherein the refractive index of the optically-isotropic layer and the mean refractive index of the optically-anisotropic layer satisfy $|n1(450) - n2(450)| \geqq 0.05$ in which $n1(\lambda)$ and $n2(\lambda)$ each mean the refractive index of the optically-isotropic layer and the mean refractive index of the optically-anisotropic layer, respectively, at a wavelength $\lambda$ [nm].

7. The optical compensation film of claim 1, wherein said at least one optically-isotropic layer is disposed on either of the surface or the rear surface thereof.

8. The optical compensation film of claim 1, wherein said at least one optically-isotropic layer is disposed on both the surface and the rear surface thereof.

9. A polarizing plate comprising a polarizing element and an optically compensation film as set forth in claim 1.

10. A liquid-crystal display device comprising an optical compensation film as set forth in claim 1.

* * * * *